United States Patent
Iwanciow et al.

[15] 3,664,133
[45] May 23, 1972

[54] SUPPORTED GRAIN DESIGN FOR HIGH ACCELERATION ROCKET MOTORS

[72] Inventors: Bernard L. Iwanciow, Sunnyvale; Robert A. Chase, Los Altos Hills, both of Calif.

[73] Assignee: The United States of America as represented by the Secretary of the Navy

[22] Filed: June 30, 1965

[21] Appl. No.: 469,974

[52] U.S. Cl. ................................60/255, 102/102
[51] Int. Cl. .........................................F02k 9/04
[58] Field of Search ............60/35.6, 255; 102/98, 102

[56] References Cited

UNITED STATES PATENTS

| | | | |
|---|---|---|---|
| 2,995,091 | 8/1961 | Haymes et al. | 102/98 |
| 3,048,968 | 8/1962 | Hutchinson | 60/35.6 |
| 3,090,196 | 5/1963 | Brewer | 102/98 X |

OTHER PUBLICATIONS

" Recent Advances in Solid Propellant Grain Design," 60-35.6 R.S. by Jean A. Vandeakerckhove, A.R.S. Journal, Vol. 29, No. 7, July 1959, pages 483– 491.

*Primary Examiner*—Samuel Feinberg
*Attorney*—R. I. Tompkins and E. F. Johnston

EXEMPLARY CLAIM

1. A solid propellant rocket motor comprising a case having a generally cylindrical chamber section, a forward closure, and a nozzle section;

for carrying solid propellant grain, a plurality of structural reinforcements constituting ribs extending longitudinally in said cylindrical chamber, disposed with the heights of said ribs positioned generally radially of said chamber and spaced circumferentially from one another around the interior of said chamber;

means connecting said reinforcement to said case at the said forward closure so that acceleration loads place said reinforcements in tension; and solid propellant grain bonded to said reinforcements.

10 Claims, 4 Drawing Figures

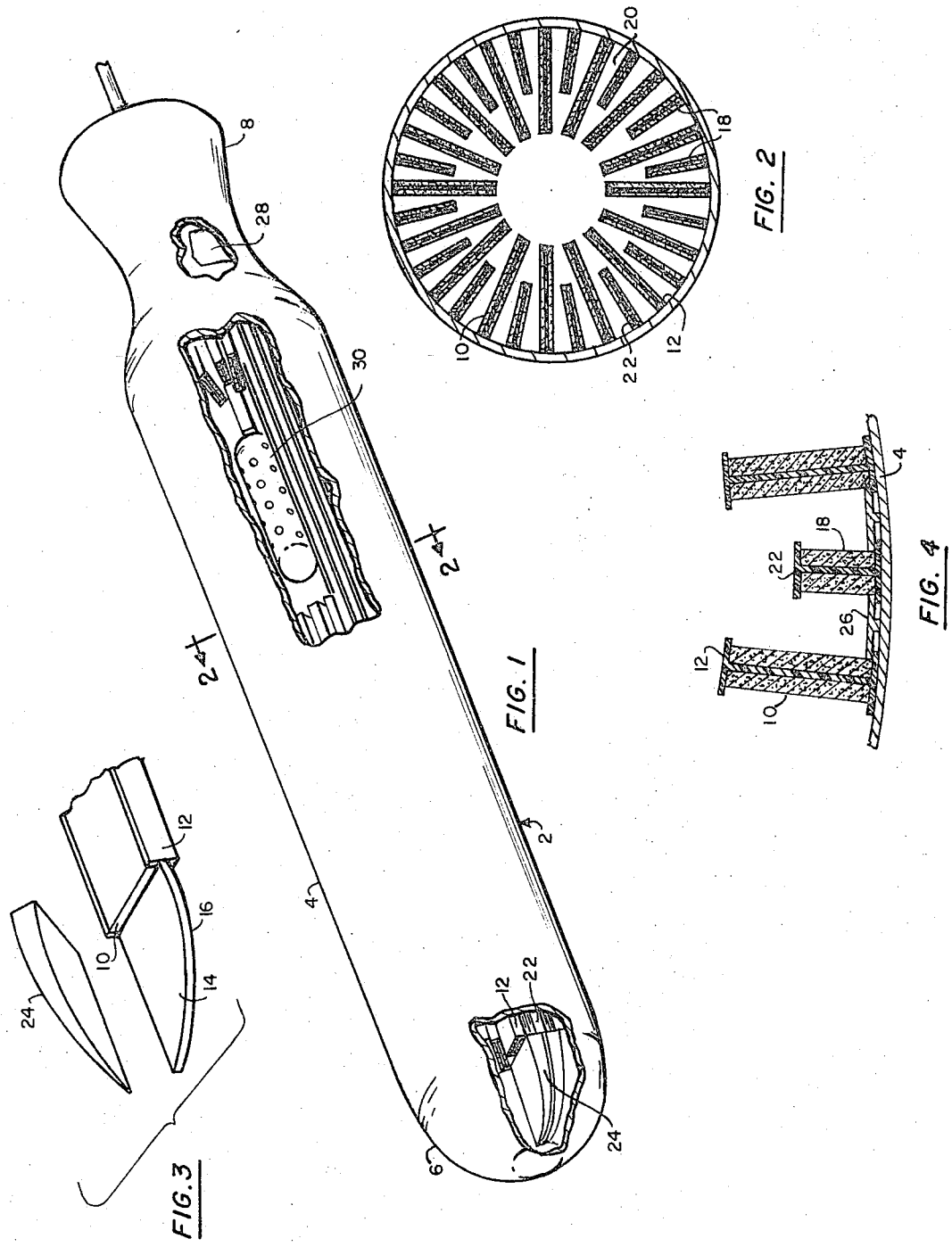

SUPPORTED GRAIN DESIGN FOR HIGH ACCELERATION ROCKET MOTORS

This invention relates to a supported grain design for high acceleration rocket motors.

The general problem of the development of an anti-missile missile places an unusually high acceleration requirement on a propulsion system. The object of this invention is to provide a rocket motor for use in such missiles in which a solid propellant grain can be subjected without structural failure to accelerations of the order of from some 300 $g$'s to perhaps over 2,000 $g$'s.

Other objects and many of the attendant advantages of the invention will become apparent from the following detailed description of the invention when considered in conjunction with the accompanying drawings wherein:

FIG. 1 is an axonometric exterior view of a rocket motor using a preferred embodiment of this invention, the view being partially broken away to show the interior construction.

FIG. 2 is a cross section taken along the line 2—2 in FIG. 1.

FIG. 3 is an enlarged fragmentary exploded view of the forward end of a grain-supporting reinforcement and a spacer visible in the broken-away portion of the forward end of the rocket motor of FIG. 1; and FIG. 4 is a fragmentary cross-sectional view taken perpendicular to the longitudinal axis of the motor of FIG. 1 showing means for retaining reinforcements carrying solid propellant against displacement relative to the motor case except in the longitudinal direction.

Because of the high accelerations required in an anti-missile missile, the booster must be designed to discharge propellant gases through the nozzle at a high rate of discharge as governed by the thrust equation, $$F = \dot{m} I$$

where

F = thrust
$\dot{m}$ = mass rate of discharge
I = specific impulse of the propellant The equations governing the rate of generation of propellant gases and the rate of discharge of gases through the nozzle which are equal at equilibrium are:

$$\dot{m} = P_s S r = C_d P_c A_t$$

where $P_s$ = propellant density
S = surface area of propellant being burned
r = burning rate of propellant
$C_d$ = discharge coefficient
$P_c$ = chamber pressure
$A_t$ = thrust area To attain the required value of $\dot{m}$, either a high burning rate propellant in a grain configuration characterized by a small surface area or a low burning rate propellant with a high surface area can be utilized.

The state of the art of propellant technology is such that the available burning rates are not high enough to develop the required propulsion systems with conventional geometries; therefore, the grain design of this invention was developed to utilize conventional propellants with a novel grain geometry. This invention is based upon the use of a supporting structure which carries the acceleration load that would otherwise, in conventional rocket motors, be imposed upon the propellant. The substitution of this supporting structure for the load-carrying function in place of the propellant, eliminates the need for a high strength propellant.

For a preferred embodiment of the invention, reference is now made to the drawing. In FIG. 1 there is shown generally at 2 a rocket motor embodying the invention. The casing 4 can be made of steel, fiberglass, or any other suitable material and comprises a generally cylindrical major portion forming a cylindrical chamber, a forward closure or head end 6, conveniently generally hemispherical, and a nozzle 8. The propellant 10 which can be conventional solid propellant grain such as that made of binder, oxidizer (typically ammonium perchlorate) and catalyst, is bonded to and carried by a plurality of structural supports or reinforcements. One group of such structural reinforcements or supports is made up of a plurality of ribs 12 each of which may be of any suitable shape but are shown for illustration only to be generally in the form of an I beam. The propellant 10 is bonded to the ribs in the channel-shaped cavities in the I beams constituted by the webs and flanges of the I beams. The ribs extend generally longitudinally along the length of the interior of the motor case and are disposed with the heights of the ribs positioned generally radially of the case as seen most clearly in the cross-sectional view in FIG. 2. The I-beam shaped ribs are fastened to the motor case in the region of the forward closure 6. This can be accomplished in any convenient fashion. For example, the web of the I beam rib 12 can be extended as seen at 14 in FIG. 3 and configured to fit the contour of the forward closure 6 as indicated by the curved portion 16. The propellant structural support or reinforcement 12 is placed in the motor case with the web extension 14 of the I beam reinforcement 12 fitting against the interior surface of the forward closure 6 as seen in FIGS. 1 and 2 and the supports carrying the propellant are then fastened to the case by potting the extensions 14 in the forward closure 6 with any suitable bonding material such as epoxy resin.

To increase the amount of propellant which can be loaded into the motor, smaller propellant strips, generally indicated at 18, are used to partially fill the wedge-shaped space 20 which is formed, between adjacent propellant slabs of the relatively larger size carried on the reinforcement 12, in the region of the cylindrical chamber where the chamber is of relatively greater diameter. The slabs or strips 18 of propellant are bonded to structural supports 22 in the same manner as propellant strips 10 are bonded to supports 12. The only difference is that the height of the I beam or similar section is less in case of the elements 22 than in the case of the elements 12. An extension of the web of each reinforcement 22, similar to the extension 14 of the support 12, is formed to facilitate fastening each support 22 to the motor case. To maintain the supports 12 and 22 properly spaced from one another and to reduce the amount of potting or bonding material necessary to bond the supports 12 and 22 to the forward closure 6, spacers 24 are inserted between the web extensions of the member 12 and the web extensions of the members 22 on each side of each member 12 as seen especially in FIG. 1. The potting or bonding material is poured or otherwise placed into the forward closure after all the supports 12 and 22 and the spacers 24 are in place.

Any other suitable means can be used to fasten to the motor case 4 the supports 12 and 22 so long as they are of the type which serves to transmit from the case to the supports tensile forces directed longitudinally of the case. For example, a spider can be bonded, welded, or bolted to the forward end of the case and projections on the members 12 and 22 can be used to engage the spider. The members 12 and 22 can be bolted or otherwise fastened to the spider.

The elements 12 and 22 can be bonded to the case 4 essentially along their entire length or, if preferred, they can be held against the case 4 in such a manner to allow only longitudinal displacement relative to the case 4 by any convenient means such as T-shaped lugs 26 fastened to the case 4 and engaging flanges of the elements 12 and 22 as seen in FIG. 4. Such an arrangement accommodates relative displacement of the case and reinforcements occasioned by thermal expansion.

The elements 12 and 22 can be made of any suitable heat resistant, high tensile strength material such as structural fiberglass sheet.

The motor may be provided in known manner with molded graphite cloth 28 in the nozzle to resist high temperatures. The propellant can be ignited by a conventional igniter tube 30 carried by the nozzle or by the launching facility.

The thickness of the grain support structure exemplified by the I-beam-shaped ribs is related to the dimensions of the grain, the tensile strength of the support material, the propellant density, the dimensions of the propellant slabs and the acceleration level at the start of boost. The thickness can be calculated from:

$$h' = (2p\,l\,hg)/S$$

where $h'$ = thickness of support structure
$S$ = tensile strength of support structure material
$p$ = propellant density
$l$ = length of grain slab
$h$ = thickness of propellant slab
$g$ = acceleration at start of boost An example is calculated for the following set of parameters:

$p = 0.063$ No./in$^3$
$l = 100$ in $$h' = \frac{2 \times .063 \times 100 \times 0.5 \times 500}{70,000}$$

$h = 0.5$ in
$g = 500$ g's
$h' = 0.045$ in.
$S = 70,000$ psi (fiberglass)

The maximum shear stress at the propellant-support structure interface is determined by the propellant thickness, propellant density and acceleration and is given by the expression:

$$\sigma_{max} = hg$$

Thus for the example given, the structure support is under a tensile stress of 70,000 psi at the start of boost while shear stress at the propellant-support interface is only:

$$\sigma_{max} = 0.063 \times 0.5 \times 500$$
$$= 15.75 \text{ psi shear}$$

This shear stress is well below the nominal 50 psi shear strength of conventional propellants.

As stated previously, a propellant with a low burning rate requires a large surface area to obtain the necessary mass discharge rates. Use of the multiple slab configuration of this invention with thin webs assures this high surface area. Tests using simulated high $g$ forces have shown that a test specimen with the grain configured according to this invention did not fail when forces corresponding to 2,200 $g$'s were impressed upon it.

Obviously many modifications and variations of the present invention are possible in the light of the above teachings. It is therefore to be understood that within the scope of the appended claims the invention may be practiced otherwise than as specifically described.

What is claimed is:

1. A solid propellant rocket motor comprising a case having a generally cylindrical chamber section, a forward closure, and a nozzle section;
   for carrying solid propellant grain, a plurality of structural reinforcements constituting ribs extending longitudinally in said cylindrical chamber, disposed with the heights of said ribs positioned generally radially of said chamber and spaced circumferentially from one another around the interior of said chamber;
   means connecting said reinforcements to said case at the said forward closure so that acceleration loads place said reinforcements in tension; and
   solid propellant grain bonded to said reinforcements.

2. The motor of claim 1 wherein certain of the reinforcements have relatively greater heights and certain others of said reinforcements have relatively lesser heights and wherein reinforcements of relatively lesser heights are disposed between reinforcements of relatively greater heights in regions of said cylindrical chamber where said chamber is of relatively greater diameter.

3. The motor of claim 1 wherein said reinforcements are generally in the form of I beams and said solid propellant grain is bonded to said reinforcements in the channel-shaped cavities in said I beams constituted by the webs and flanges of said I beams.

4. The motor of claim 3 wherein the means connecting said reinforcements to said case includes extensions of the webs of said I beams configured to fit the contour of said forward closure and bonded to said forward closure.

5. The motor of claim 1 wherein said connecting means connects said reinforcements to said case in the region of said forward closure and wherein means are provided, spaced, in a longitudinal direction from said forward closure, to essentially retain said reinforcements from displacement relative to said case except in the longitudinal direction, whereby to allow for relative displacement of case and reinforcements occasioned by thermal expansion.

6. The motor of claim 1 wherein said reinforcements are configured to fit the contour of said forward closure and bonded to said forward closure.

7. The motor of claim 1 wherein said reinforcements are generally in the form of I beams and are of high tensile strength fiberglass material.

8. The motor of claim 1 wherein spacers are inserted between said reinforcements in said forward closure for maintaining said reinforcements properly spaced from one another.

9. The motor of claim 1 wherein holding means are placed between said reinforcements for holding said reinforcements to the case and for allowing only longitudinal displacement.

10. The motor of claim 9 wherein said holding and spacing means comprise
    T-shaped lugs attached to the case and engaging said reinforcements.

* * * * *